United States Patent [19]
Bell

[11] Patent Number: 4,748,514
[45] Date of Patent: May 31, 1988

[54] VARIABLE RATE SCANNING CONTROL

[75] Inventor: Gregory E. Bell, Rochester, N.Y.

[73] Assignee: Xerox Corporation, Stamford, Conn.

[21] Appl. No.: 945,156

[22] Filed: Dec. 22, 1986

[51] Int. Cl.$^4$ .............................................. H04N 1/17
[52] U.S. Cl. ..................................... 358/288; 358/285
[58] Field of Search ................. 358/288, 285, 293, 294

[56] References Cited
U.S. PATENT DOCUMENTS

| | | | |
|---|---|---|---|
| 4,160,279 | 7/1979 | Fuwa | 358/288 |
| 4,367,493 | 1/1983 | Matteson | 358/293 |
| 4,521,813 | 6/1985 | Yoshida | 358/296 |
| 4,591,727 | 5/1986 | Gaebelein et al. | 250/578 |
| 4,628,368 | 12/1986 | Kurata et al. | 358/293 |

Primary Examiner—Tommy P. Chin
Attorney, Agent, or Firm—Frederick E. McMullen

[57] ABSTRACT

A scanner with scanning array on a movable carriage, a control for regulating the scanning speed of the carriage, a small buffer between the scanner and a workstation, a buffer capacity sensor for continuously monitoring the residual capacity of the buffer, a motion sensor for actuating the array to scan an image line each time the carriage moves a distance of one scan line, and a controller for regulating scanning speed of the carriage to substantially match the image signal output rate of the array with the image signal input rate of the workstation while maintaining a predetermined level of buffer residual capacity, the controller reducing carriage scanning speed as buffer residual capacity decreases in order to maintain the scanner operating as long as possible in the event workstation demand ceases and minimize carriage acceleration/deacceleration forces on scanner noise, vibration, and image quality.

5 Claims, 6 Drawing Sheets

VARIABLE RATE SCANNING CONTROL

VARIABLE RATE SCANNING CONTROL

The invention relates to raster input scanners and electronic reprographic copiers, and more particularly, to a variable rate scanning control for raster input scanners.

Within the field of digital imaging, graphic input scanners can be differentiated by whether they are synchronous or asynchronous. Synchronous means that the scanner will deliver image data at a fixed and constant rate. Thus, the system to which the scanner is attached must accept the data at that rate. An asynchronous scanner on the other hand delivers data on request of the workstation and stops when the demand is interrupted.

Implementation of the asynchronous type scanner can occur in several forms. One method is to make the scanning mechanism stop and start on each scanline. A time delay is inserted between each scan to match the demand of the workstation. A second method is to scan a portion of the document and synchronously load the scanned data into a buffer. When the buffer is filled, it can be emptied asynchronously to the workstation while the mechanical system prepares to scan further. Another method is to scan a full page and load the scanned data into a large buffer. Then, the buffer is emptied asynchronously to the workstation.

Each of above methods has drawbacks relating to system performance or cost. The first mentioned stop-start method of asynchronous control puts severe requirements on the scanner drive motor and related scanning hardware which is required to accelerate and decelerate rapidly on demand. The second method requires data buffering and also puts severe requirements on scanner motor performance. The third method relieves motor requirements to some degree, but offsets this by requiring large amounts of computer memory which is prohibitively expensive, particularly where a low cost scanner is the object. And the second and third methods also require accurate velocity control of the scanning mechanism to assure acceptable scanned image quality.

In prior art facsimile systems, an image document to be transmitted is scanned at one station and the resulting video image signals transmitted over telephone lines to a remote printing station where a copy of the document image being scanned is printed. Since the cost associated with use of telephone lines is directly proportional to time, considerable attention has been given by the prior art to reducing the number of video signals and cut transmission time and hence cost. In this context, U.S. Pat. No. 4,160,279 (Fuwa) discloses a facsimile system in which a data compressor is used to reduce the number of video signals required to be transmitted. In this case, the compressor reads the video signals from the buffer memory. The scanning speed of the scanner and the signal output to the buffer memory is controlled so as to correlate with the current data compression rate. In another facsimile system, U.S. Pat. No. 4,521,813 (Yoshida et al), the fact that the paper feed driving motor of the remote output requires some time to accelerate up to speed is recognized and to this end, arrangements are made to store the transmitted image signal during the acceleration period. In U.S. Pat. No. 4,591,727 (Gaebelein et al), the prior art provides a system for accommodating light variations resulting from variations in the scanner integration period, and in U.S. Pat. No. 4,367,493 (Matteson), a scanner incorporates a buffer to accommodate any disparity between the scanner scanning rate and the user data rate.

In contrast to the prior art, the present invention provides a method for asynchronously operating a combined document scanner and workstation in which the scanner has at least one scanning array supported by a motor driven carriage for scanning documents to assure an adequate supply of image signals for the workstation and reduce stopping and starting of the scanner with minimal image signal buffering and reduced scanner cost and complexity, comprising the steps of: on a demand for image signals by the workstation, actuating the carriage to accelerate the carriage with the array to scan the document to be printed; on movement of the carriage with the array through a distance equal to one scan line, actuating the array to scan the image line to produce image signals for use by the workstation; repeating the preceding step for each scan line moved by carriage; outputting the image signals produced by the array through a relatively small buffer to the workstation; continuing to accelerate the carriage to output image signals at an increasing rate through the buffer to the workstation until the rate at which image signals are output by the array exceeds the rate at which image signals are demanded by the workstation so that the buffer begins to fill with image signals reducing buffer residual capacity; monitoring the residual capacity of the buffer; and on a reduction in the buffer residual capacity below a predetermined number of image signals, adjusting the carriage motor to reduce the carriage scanning speed and the rate at which image signals are produced whereby to restore the buffer residual capacity back to the predetermined number of image signals.

The invention further provides a raster input scanner adapted for asynchronous operation having, in combination: at least one scanning array for scanning a document image to produce image signals representative of the image scanned for output to a worksation; drive means to establish relative scanning movement between the document image and the array; a relatively small buffer through which image signals output by the array are transmitted to the workstation; movement sensing means for sensing relative movement between the array and the document image; means responsive to the movement sensing means for operating the array to scan the image line viewed by the array each time the relative movement between the array and the document image equals one scan line; buffer capacity monitoring means for monitoring the residual storage capacity of the buffer to store the the image signals; and control means for adjusting the rate of relative movement between the array and the document image in response to the residual storage capacity of the buffer to match the image signal output of the array with the image signal demand of the workstation while maintaining a predetermined buffer residual capacity, the control means increasing the rate of relative movement between the array and the document image in response to an increase in buffer residual capacity above the predetermined buffer residual capacity, the control means decreasing the rate of relative movement between the array and the document image in response to a decrease in buffer residual capacity below the predetermined buffer residual capacity.

Figure 1:
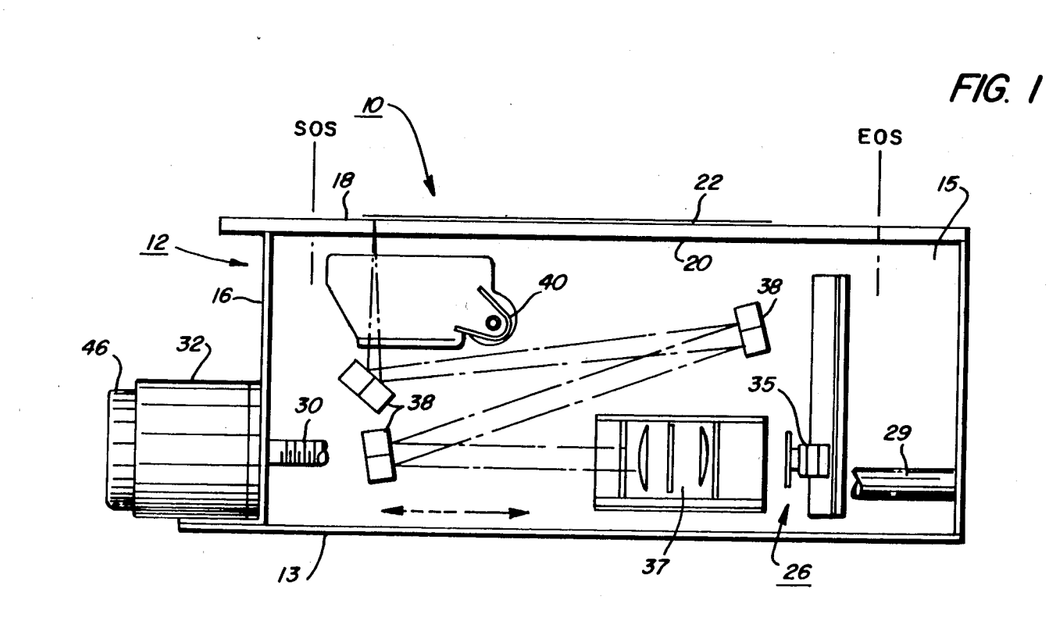
FIG. 1 is a schematic view of a raster input scanner of the type adapted to incorporate the variable rate scanning control of the present invention.

Referring to FIG. 1, there is shown an exemplary raster input scanner, designated generally by the numeral 10, incorporating the variable rate scanning control of the present invention. Scanner 10 includes a housing 12 with base 13, sides 15, and ends 16. The top 18 of housing 12 incorporates a generally rectangular transparent platen 20, typically glass, sized to accommodate the largest document original 22 to be scanned. As will be understood, a document 22 to be scanned is located either manually or by a suitable automatic document handler or feeder (not shown), on platen 20 for scanning. A scan carriage 26 is movably supported within housing 12 on base 13 for reciprocable movement underneath platen 20 on one or more longitudinally extending rails 29. Carriage driving means in the form of a drive screw 30 threadedly engaged with carriage 26 is provided, rotation of screw 30 in either a clockwise or counter-clockwise direction by a reversible carriage driving step motor 32 serving to move carriage 26 in either a forward or reverse direction as shown by the arrows in drawing FIG. 1.

A scanning array 35 such as a CCD is suitably mounted on scan carriage 26 in predetermined operative relation with platen 20 so as to scan the document resting thereon. Suitable optical means, exemplified here by lens 37 and mirrors 38, are provided to focus the scanning array 35 on a line-like area extending across the width of platen 20 and perpendicular to the direction of movement of carriage 26. A lamp 40 is provided for illuminating the line-like area on which array 35 is focused.

While the single scanning array 35 is shown and described, plural array may instead be envisioned.

Figure 2:
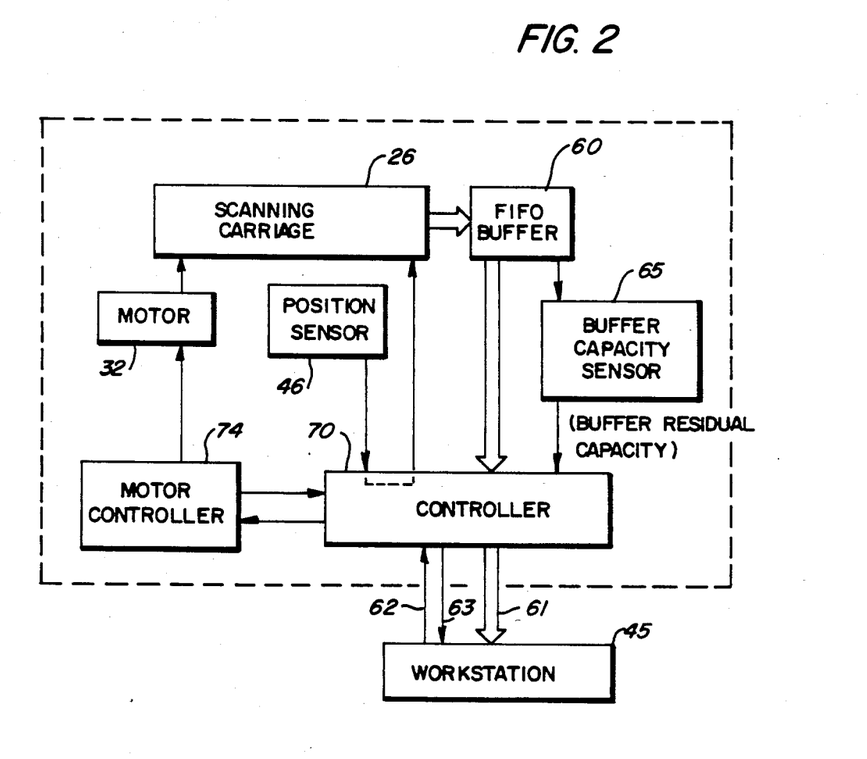
FIG. 2 is a circuit schematic illustrating details of the variable rate scanning control of the present invention in which the scanning velocity of the scanner is controlled in accordance with buffer residual capacity.

Referring to FIG. 2, scanner 10 is adapted to be coupled, either directly or through a communication channel with a local or remote output, illustrated here as workstation 45. Workstation 45 may, for example, comprise a publishing workstation, personal computer, printer, etc.

The variable rate scanning control of the present invention includes a relatively small memory buffer 60 through which the image signals or data output of scanner 10, after suitable processing and conversion to digital format, are output to workstation 45. Buffer 60, which comprises any suitable first-in-first-out (FIFO) type buffer, has a relatively small capacity equal to approximately 50 image lines.

A suitable buffer capacity sensor 65 is provided to continuously monitor the residual capacity, i.e., the instantaneous amount of image data storage available, of memory buffer 60. For example, sensor 65 may sense the capacity of buffer 60 by subtracting the amount of data read out from the amount of data stored in buffer 60. Buffer capacity sensor 65 is set to respond to a predetermined buffer residual capacity which is chosen to provide a sufficient buffer reserve to allow scan carriage 26 to be brought to a controlled stop from any speed without loss of image data yet whichis sufficient to provide a temporary supply of image data to compensate for momentary reductions or interruptions in the data input rate demanded by workstation 45 and maintain scan carriage 26 in motion for the longest possible time.

Referring to FIGS. 1 and 2, a suitable carriage position sensor, shown here in the form of an encoder 46, is provided. Encoder 46 is conveniently mounted on the opposite or back side of motor 32 so as to sense rotation of drive screw 30 and generate, with rotation of screw 30, a succession of clock pulses representing movement of scan carriage 26 along rails 29. The clock pulse output of encoder 46 is set so that each clock pulse or block of clock pulses output by encoder 46 corresponds to movement of carriage 26 and the array 35 supported thereon through a distance equal to one scan line. Other arrangements for sensing displacement of scan carriage 26 may be envisioned.

A suitable microprocessor based controller 70 is provided for controlling and synchronizing operation of the component parts of scanner 10 when scanning a document 22 on platen 20 in response to a demand for image data by workstation 45. A suitable motor controller 74 for controlling starting, stopping, direction, and speed of carriage driving motor 32 in response to control signals from controller 70 is provided. Controller 70 also controls integration, transfer, output, and rest of array 35 and energization of scan lamp 40.

Buffer capacity sensor 65 provides a signal input (BUFFER RESIDUAL CAPACITY) to controller 70 reflecting the instantaneous residual storage capacity of buffer 60 during operation of scanner 10. A suitable data bus 61, and address and control lines 62, 63 respectively enable the transmission of image date through buffer 60 to workstation 45 and the exchange of control and address signals between controller 70 and workstation 45.

OPERATION

As used herein, the term 'buffer residual capacity equivalent to scan rate' refers to an equilibrium condition in which the image data output rate of scanner 10 matches the image data demand rate of workstation 45 and buffer 60 is partially filled with image data such that buffer 60 has a predetermined residual capacity.

In operation and referring particularly to FIGS. 1-4, at the start of scan, buffer 60 is normally empty following completion of processing of the preceding document. The next document 22 to be scanned is placed on platen 20 in proper scanning position and scanner 10 actuated. On a demand for image data by workstation 45, the scanning cycle is started, a signal (START SCAN) from controller 70 actuating motor driver 74 to start carriage driving motor 32. Motor 32 rotates drive screw 30 to start scanning movement of carriage 26 (START CARRIAGE), carriage 26 being moved in the direction shown by either the solid or dotted line arrow in FIG. 1 depending upon the operating design of scanner 10. In the example shown in FIG. 1, scan carriage 26 with scanning array 35 moves in the direction shown by the solid line arrow from a Start-Of-Scan (SOS) position to an End-Of-Scan (EOS) position while scanning the document 22 on platen 20. A signal from controller 70 to lamp driver 82 energizes scan lamp 40 (POWER ON LAMP).

Figure 4A:
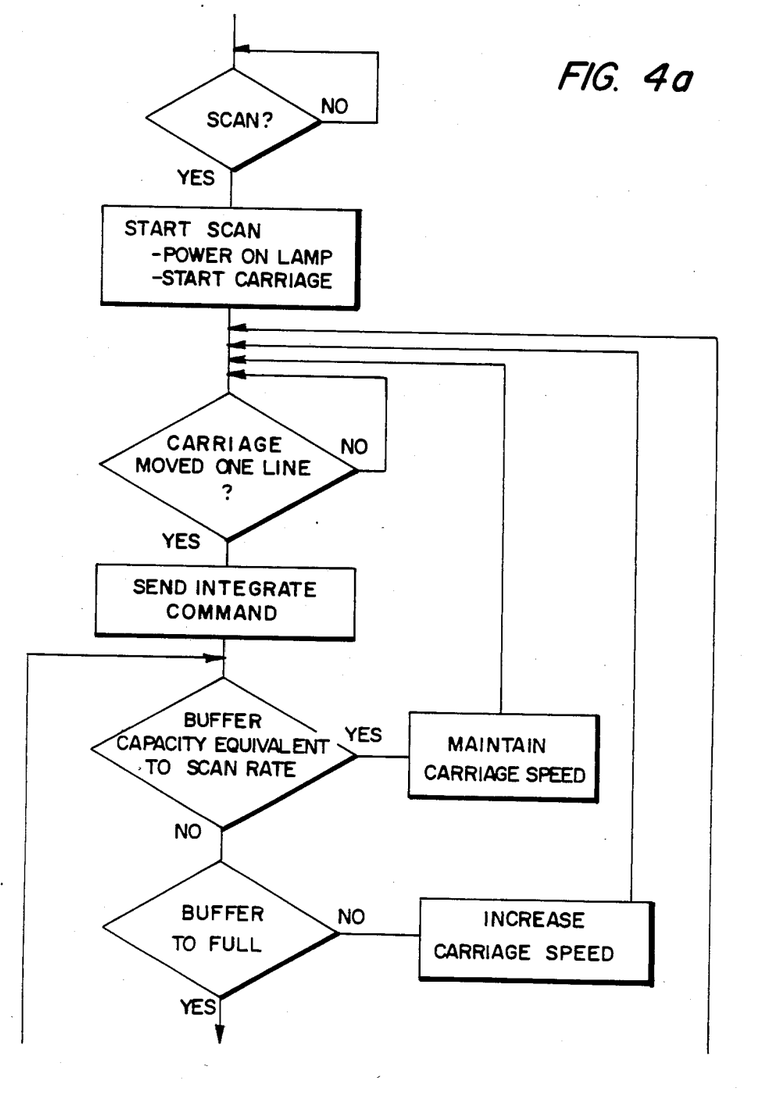
FIGS. 4a and 4b are flow charts depicting the scan cycle operation of the variable rate scanning control of the present invention.

With actuation of motor 32 and rotation of drive screw 30, carriage 26 together with array 35 is accelerated from a stopped position toward maximum scanning speed, such acceleration being at a relatively slow predetermined rate designed to reduce loads on the scanner components and permit use of relatively less expensive components. With actuation of motor 32 and rotation of drive screw 30, encoder 46 outputs clock pulses to controller 70 and a controller 70, each time scan carriage 26 and array 35 moves through a distance equal to one scan line (CARRIAGE MOVED ONE LINE), outputs an integrate command (SEND INTEGRATE COMMAND) to scanning array 35 to initiate the scanning cycle. As a result, a succession of image signals representing the image content of the document line viewed by array 35 are output to buffer 60 and workstation 45.

As carriage 26 continues to move, the foregoing scanning process is repeated each time carriage 26 advances one scan line. However, since carriage 26 is presumed to be accelerating at this point, the scanning rate and hence the rate at which image data is output to buffer 60 and workstation 45 progressively increases.

Where the residual capacity of buffer 60 is not equivalent to the scan rate (BUFFER CAPACITY EQUIVALENT TO SCAN RATE) and buffer 60 is not too full (BUFFER TOO FULL), the scanning speed of carriage 26 continues to be increased (INCREASE CARRIAGE SPEED). When scan carriage 26 with array 35 reaches a scanning velocity where the buffer residual capacity is equivalent to the scan rate (BUFFER CAPACITY EQUIVALENT TO SCAN RATE), a signal from controller 70 to motor driver 74 sets carriage driving motor 32 to a constant speed (MAINTAIN CARRIAGE SPEED). Scanner 10 accordingly outputs image data at a rate matching the data rate demand of workstation 45.

In the event that the scanning speed of carriage 26 is such that the data output rate of scanner 10 becomes greater than the data input rate of workstation 45, the excess image data is stored in buffer 60. This decreases the residual capacity of buffer 60 below the predetermined level for which buffer capacity sensor 65 is set to respond and buffer 60 becomes too full (BUFFER TOO FULL). Sensor 65 responds to this decrease in buffer residual capacity, the signal output of sensor 65 to controller 70 causing controller 70 to actuate motor controller 74 which in turn adjusts scan carriage driving motor 32 to reduce the scanning speed of carriage 26 (DECREASE CARRIAGE SPEED). The reduction in carriage scanning speed effects the corresponding reduction in the data output rate of scanner 10 required to balance the data output rate of scanner 10 with the data input rate required by workstation 45 and restores the buffer residual capacity back to the predetermined level desired.

Figure 4B:
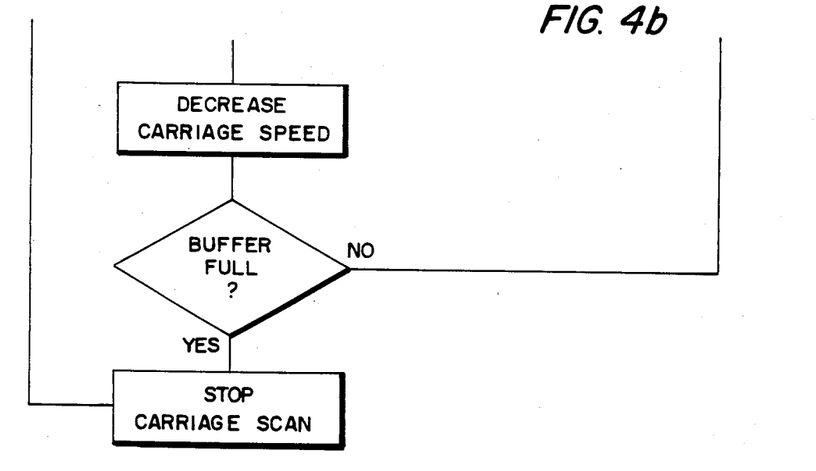

Should the demand for image data by workstation 45 be terminated or interrupted while scanning is underway, buffer 60 begins to fill. Controller 70 responds to the resulting derease in buffer residual capacity (BUFFER TOO FULL) as sensed by sensor 63 by reducing the scanning speed of carriage 26 as described above. Should the interruption in demand continue, the scanning speed of carriage 26 is continuously reduced as buffer 60 fills and the residual buffer capacity decreases. When buffer 60 is full (BUFFER FULL) controller 70 responds to the signal output of sensor 65 to stop carriage drive motor 32 and terminate scanning movement of carriage 26.

On resumption of the demand for image data by workstation 45, scan carriage 26 is accelerated (either from a stop or from some intermediate speed) in the manner described previously except in this case the image data held in buffer 60 serves as the initial source of image data for workstation 45 until scan carriage 26 reaches the scanning speed necessary to maintain buffer capacity equivalent to the scan rate.

When the scanning cycle is completed, scanning is stopped and controller 70 resets carriage 26 to the appropriate start of scan position for scanning the next document. In the FIG. 1 example, the scanning cycle ends when the EOS position is reached. In this example, control signals from controller 70 to motor controller 74 operate motor 32 to move scan carriage 26 in the direction shown by the dotted line arrow to return carriage 26 with scanning array 35 to the SOS position preparatory to scanning the next document. With the scanning cycle completed, the variable rate scanning control is in effect disabled and buffer 60 is emptied of any remaining image data in response to the demand for image data by workstation 45.

Figure 3A:
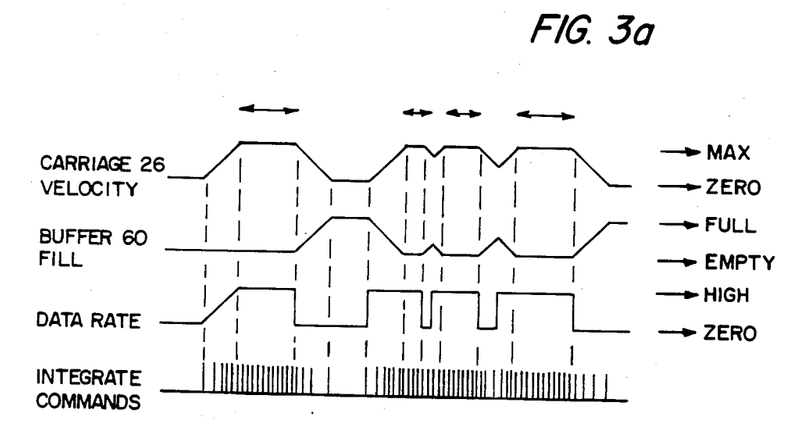
FIG. 3a is a timing chart showing the relationship between carriage velocity, buffer residual capacity, and workstation data rate where the scanner limits data rate.

In FIG. 3a, there is illustrated a scanner operating mode where scanner 10 is processing documents 22 that are composed principally of line copy. Since images of that type can normally be represented by single bits (i.e., binary "1" and "0"), the image data output rate of scanner 10 is relatively high and typically will reach the maximum data rate for which scanner 10 is designed. Accordingly, in this operating mode, maximum scanning carriage velocity (MAX.) and the highest data rates (HIGH) are typically reached as shown by FIG. 3a.

Figure 3B:
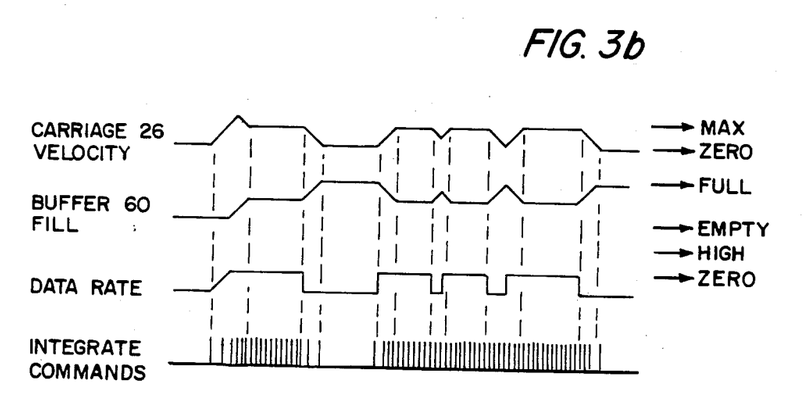
FIG. 3b is a timing chart showing the relationship between carriage velocity, buffer residual capacity, and workstation data rate where the workstation limits data rate.

In FIG. 3b, scanner 10 is presumed to be processing documents that are mostly composed of continuous or half tone images. There, to accommodate the varying image grey levels and enchance accuracy, multi-bit image representations may be used. Because of this, the amount of data that must be processed is substantially increased so that scanner 10 cannot ordinarily reach the maximum processing rate for which scanner 10 was designed. As a result, the scanning velocity of carriage 26 and the scanner data output rate are less than maximum as illustrated.

It is understood that the operating modes illutrated in FIGS. 3a and 3b are exemplary only and may vary with scanner design and type, the manner in which image signals are processed, with variations in the type or mix of documents 22 being scanned, etc.

Figure 5:
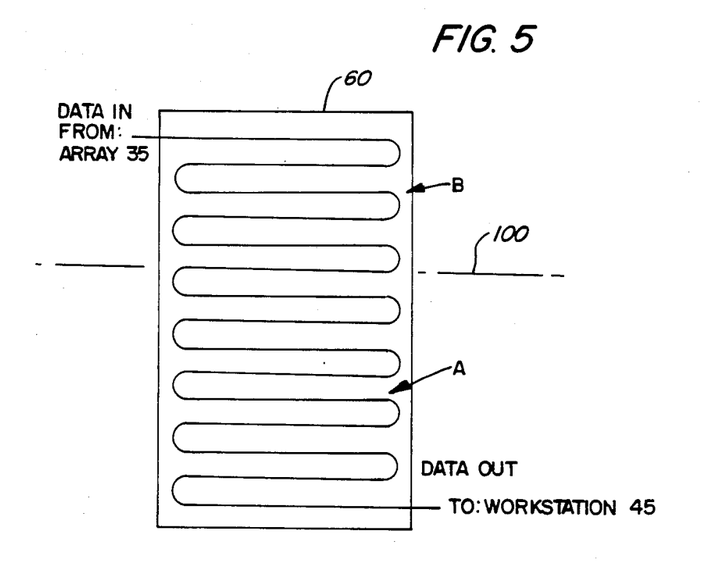
FIG. 5 is a schematic of a FIFO buffer depicting the concept of variable rate scanning control through buffer residual capacity.

In FIG. 5, there is shown an example in which the desired residual capacity of buffer 60 for a given scan rate is depicted by line 100. Accordingly, in a steady state condition where buffer capacity is equivalent to scan rate, the scanning speed of carriage 26 is set so that the portion A of buffer 60 below line 100 is full of data while the buffer portion B above line 100, which represents buffer residual capacity, is empty. Should the rate at which data is required by workstation 45 fall, in the absense of a corresponding reduction in the rate at which scanner 10 generates data, the amount of data stored in buffer 60 will increase and rise above line 100 and into buffer portion B. Buffer 60 will therefore become too full. Sensor 65 as described senses the resulting decrease in buffer residual capacity and reduces the scanning speed of carriage 26 to reduce the scan rate so that the amount of data held in buffer 60 falls to the level indicated by line 100. As a result, portion B of buffer 60 is emptied, restoring the buffer condition illustrated in FIG. 5.

Should the amount of data held in portion A of buffer 60 decrease causing the buffer residual capacity represented by portion B to increase, the scanning speed of carriage 26 is increased to increase the scan rate and raise the amount of data held in portion A of buffer 60. This in turn reduces the residual capacity of the buffer portion B, restoring the system to the equilibrium condition illustrated in FIG. 5.

At the end of the scanning cycle and the input of fresh data to buffer 60, operation of the variable rate scanning control is terminated. Buffer 60 continues to supply image data remaining in the buffer to workstation 45 until buffer 60 is emptied.

As a result, asynchronous operation of scanner 10 is enhanced without incurring the penalty or cost of a large internal buffer. Instead, a relatively small inexpensive buffer is used which serves, through limited buffer storage and the use of scan carriage control, to maintain scan carriage motion for the longest possible time in the event of an interruption in the demand for image data, thereby delaying the need to stop and then start the scan carriage. At the same time, the small buffer nevertheless provides a data reserve, permitting sudden increases in the demand for image data to be absorbed without the need to rapidly start or accelerate the scan carriage. As a result, the scan carriage components may be designed for lighter duty with consequent reduction in cost and complexity.

While the invention has been described with reference to the structure disclosed, it is not confined to the details set forth, but is intended to cover such modifications or changes as may come within the scope of the following claims.

I claim:

1. A method for asynchronously operating a combined document scanner and workstation in which the scanner has at least one scanning array supported by a motor driven carriage for scanning documents to assure an adequate supply of image signals for said workstation and reduce stopping and starting of the scanner with minimal image signal buffering and reduced scanner cost and complexity, comprising the steps of:
   (a) on a demand for image signals by said workstation, actuating said carriage to accelerate said carriage with said array to scan the document to be printed, acceleration of said carriage providing a carriage scanning speed;
   (b) on movement of said carriage with said array through a distance equal to one scan line, actuating said array to scan said line to produce said image signals for use by said workstation;
   (c) repeating step b for each scan line moved by said carriage;
   (d) outputting the image signals produced by said array through a relatively small buffer to said workstation;
   (e) continuing to accelerate said carriage to output said image signal at an increasing rate through said buffer to said work station until the rate at which said image signals are output by said array exceeds the rate at which said image signals are demanded by said workstation so that said buffer begins to fill with said image signals reducing the residual capacity of said buffer;
   (f) monitoring said buffer residual storage capacity; and
   (g) on a reduction in said buffer residual storage capacity below a predetermined number of said image signals, adjusting said carriage motor to reduce said carriage scanning speed and the rate at which said image signals are produced whereby to restore said buffer residual storage capacity back to said predetermined number of said image signals while matching the rate at which said image signals are output by said array with the rate at which image signals are demanded by said workstation.

2. The method according to claim 1 including the steps of:
   (a) on an increased demand for said image signals by said workstation, drawing said image signals from said buffer whereby said buffer residual storage capacity is increased above said predetermined number of said image signals; and
   (b) on said increase in said buffer residual storage capacity above said predetermined number of said image signals, adjusting said carriage motor to increase said carriage scanning speed and the rate at which said image signals are produced whereby to restore said buffer residual storage capacity back to said predetermined number of said image signals.

3. The method according to claim 2 including the steps of:
   (a) on an interruption in the demand for said image signals by said workstation, adjusting said carraige motor to progressively reduce said carriage scanning speed as said buffer residual storage capacity decreases whereby to maintain said carriage in motion as long as possible and avoid stopping said carriage; and
   (b) bringing said carriage to a stop when said buffer residual storage capacity is used up and said buffer is full.

4. In a raster input scanner adapted for asynchronous operation having at least one scanning array for scanning a document image line by line to produce image signals representative of the image scanned for output to a workstation in response to the demand for image signals by the workstation, and drive means to establish relative scanning movement between said document image and said array, the combination of:
   (a) a relatively small buffer through which image signals output by said array are transmitted to said workstation;
   (b) movement sensing means for sensing relative movement between said array and said document image;
   (c) means responsive to said movement sensing means for operating said array to scan the image line viewed by said array each time said relative movement between said array and said document image equals one scan line;
   (d) buffer capacity monitoring means for monitoring the residual storage capacity of said buffer to store said image signals; and
   (e) control means for adjusting the rate of relative movement between said array and said document image in response to the residual storage capacity of said buffer to match the image signal output of said array with the demand for image signal by said workstation and a predetermined buffer residual storage capactiy is attained;

said control means increasing the rate of relative movement between said array and said document image in response to an increase in said buffer residual storage capacity above said predetermined buffer residual storage capacity, said control means decreasing the rate of relative movement between said array and said document image in response to an decrease in said buffer residual storage capacity below said predetermined buffer residual storage capacity.

5. The scanner according to claim 4 including:

a movable scan carriage supporting said array for scanning movement, said drive means including a drive motor for moving said scan carriage whereby to establish said relative movement between said document and said array;

said control means controlling said drive motor to adjust the scanning speed of said scan carriage whereby to control the rate of relative movement between said array and said document image.

* * * * *